(12) United States Patent
Wu

(10) Patent No.: US 8,549,608 B2
(45) Date of Patent: Oct. 1, 2013

(54) IMPLEMENT METHOD AND DEVICE OF TERMINAL CALL FIREWALL

(75) Inventor: Huaqiang Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 28 days.

(21) Appl. No.: 13/146,587

(22) PCT Filed: Aug. 21, 2009

(86) PCT No.: PCT/CN2009/073408
§ 371 (c)(1),
(2), (4) Date: Jul. 27, 2011

(87) PCT Pub. No.: WO2010/102476
PCT Pub. Date: Sep. 16, 2010

(65) Prior Publication Data
US 2011/0283349 A1   Nov. 17, 2011

(30) Foreign Application Priority Data

Mar. 12, 2009  (CN) .......................... 2009 1 0079484

(51) Int. Cl.
*H04L 29/06* (2006.01)
(52) U.S. Cl.
USPC .............................. 726/11; 713/153; 713/154
(58) Field of Classification Search
USPC ................... 726/4, 11, 12, 21; 713/153, 154; 379/8, 210.02, 210.03, 207.02, 88.19
See application file for complete search history.

(56) References Cited

U.S. PATENT DOCUMENTS

| 5,905,794 | A  | * | 5/1999  | Gunn et al. ................... 379/382 |
| 6,519,335 | B1 | * | 2/2003  | Bushnell .................. 379/215.01 |
| 7,577,239 | B1 | * | 8/2009  | Shim et al. ................. 379/88.22 |
| 2003/0186688 | A1 | * | 10/2003 | Mizuno ......................... 455/415 |
| 2003/0220099 | A1 | * | 11/2003 | Hama ........................... 455/415 |
| 2004/0081303 | A1 |   | 4/2004  | Tsai et al. |
| 2008/0144782 | A1 | * | 6/2008  | Chou ......................... 379/88.01 |
| 2008/0243920 | A1 | * | 10/2008 | Newman et al. ........... 707/104.1 |
| 2009/0106318 | A1 | * | 4/2009  | Mantripragada et al. .. 707/104.1 |
| 2010/0226261 | A1 | * | 9/2010  | Piche ............................ 370/252 |

FOREIGN PATENT DOCUMENTS

| CN | 1805476 A   | 7/2006  |
| CN | 101202791 A | 6/2008  |
| CN | 101282527 A | 10/2008 |
| CN | 101291362 A | 10/2008 |
| CN | 101510908 A | 8/2009  |

OTHER PUBLICATIONS

P.R. China, State Intellectual Property Office, International Search Report for International Application No. PCT/CN2009/073408, date of mailing: Oct. 29, 2009.

* cited by examiner

*Primary Examiner* — Chau Le
(74) *Attorney, Agent, or Firm* — Bright IP Law Offices

(57) ABSTRACT

An implement method and device of a terminal call firewall is disclosed. According to the method, a call number is added into a blacklist list when it is determined that the call number is not in the blacklist list stored and an address list and it is determined that a call duration is less than a set call duration threshold. A device is disclosed for automatically blocking incoming calls to the terminal according to the method.

4 Claims, 3 Drawing Sheets

IMPLEMENT METHOD AND DEVICE OF TERMINAL CALL FIREWALL

FIELD OF THE INVENTION

The present invention relates to the mobile terminal application field, in particular to an implement method and device of a terminal call firewall.

BACKGROUND OF THE INVENTION

With the rapid development of mobile communication technology and the coming of the third generation (3G) digital communication era, the mobile terminal has become a necessary for the daily life of people. But with the development, the use of the mobile terminal also brings people a lot of harassments which mainly lie in: the harassing call, which is called generally from an unknown number and is hung up immediately after the ringing lasts less than three seconds, wherein if the user calls back, the call may be an audio message lottery fraud trap or the user has been charged with high information fees, therefore the people who can not power off the mobile terminal at night are often woke up by the harassing call or the junk message which has seriously affected the sleep. Consequently, the user has paid more and more attention to the mobile terminal with the function of filtering the harassing call, and the "call firewall" function emerges because of the demand.

At present, most terminal manufacturers provide the call firewall function to adapt the demand of the user. The implement method thereof is mainly as follows: firstly presetting a blacklist in the terminal; and matching the call number with the numbers in the blacklist one by one when the terminal is called, wherein it does not indicate the user of the call but hangs up the phone automatically if the call number matches with the number in the blacklist; and indicates the user of the call normally if the call number does not match with the number in the blacklist. Some existing terminal call firewalls achieve the filtration purpose by mainly using the method of adding blacklist and friends list, and selecting the options such as "forbidding blacklist", "allowing friends", "forbidding all", "cancelling all restrictions" and so on. Currently there are some other call firewalls which realize the method of matching number wildcard, e.g. the blacklist can be set with "159*", "*1362222222", "15033333??" and so on, making the function more flexible.

However, all existing solutions have some defects. Firstly, there is not any method to identify the harassing call automatically, and the blacklist has to been added manually. For the great deal of random harassing numbers, it is extraordinary inconvenient to use this kind of firewall, which has rather bad actual effect. Secondly, the solution does not consider the situation that the harassing number is recovered by the operator. Generally speaking, one harassing number will be ceased after emerging for 1-3 months because of owing the fees or being reported, and then will be recovered by the operator after another 3-6 months, and will be sold out eventually. At this time, the user of this number is not the original user of the number in the backlist any more. The existing implement method of firewall blacklist does not consider this issue, with the result that the user can not learn which number has been recovered already when facing the increasingly enormous blacklist. These blacklists occupy a great deal of resource space. New harassing number emerges continually but can not be filtered effectively, which seriously affects the efficiency of using the mobile terminal and eventually results in that the user gives up using the call firewall function.

SUMMARY OF THE PRESENT INVENTION

In view of the above, the present invention mainly aims to provide an implement method and device of the terminal call firewall, simple and efficient and facilitated in implementation, which is used for automatically identifying random nuisance number and can further periodically maintain the effective numbers in the blacklist which may be recovered by the operator.

In order to achieve the above-mentioned aim, the technical scheme of the present invention is implemented in the following way:

According to one embodiment of the present invention, the present invention provides an implement method of a terminal call firewall.

The implement method of a terminal call firewall according to the present invention comprises:
- adding a call number into a blacklist list, when it is determined that the call number is not in the blacklist list stored and an address list and it is determined that a call duration is less than a set call duration threshold.

Wherein, the blacklist list comprises a static blacklist list and/or a dynamic blacklist list, the method comprises:
- that it is determined that the call number is not in the blacklist list stored means: it is determined that the call number is not in the static blacklist list stored;
- the step of adding the call number into the blacklist list comprises: determining whether the call number is in the dynamic blacklist list or not wherein if no, the call number is added into the dynamic blacklist list; and if yes, the call number is added into the static blacklist list, and an existing corresponding item of the number from the dynamic blacklist list.

Wherein, the step of adding the call number into the blacklist list further comprises: adding the timestamp of the call number into the blacklist list. The method also comprises: the terminal detects each blacklist record in the blacklist list; and deletes the current blacklist record when determining that difference value between current timestamp and blacklist timestamp of the current blacklist record is more than a set blacklist aging time.

In the above-mentioned solution, after adding the call number into the blacklist list, the method further comprises: recording a firewall log of the call number.

According to another embodiment of the present invention, the present invention provides a device of the terminal call firewall.

The device of the terminal call firewall according to the present invention comprises: a storage module, a judgment module, a timer and a processing module, wherein,
- a storage module, which is connected with a judgment module, and configured to store a blacklist list and an address list;
- the judgment module, which is connected with a storage module and a timer, and configured to start up the timer to start timing when a call number is determined not in the blacklist list and the address list;
- the timer, which is connected with the judgment module and a processing module, and configured to make timing for a time length of a call duration threshold;
- the processing module, which is connected with the timer, and configured to add the call number into the blacklist list when the duration of the call is determined less than the call duration threshold.

Wherein, the blacklist list stored in the storage module comprises: a dynamic blacklist list and/or a static blacklist list;

the judgment module is used to determine that the call number is not in the static blacklist list.

Wherein, the processing module comprises a time processing module and a dynamic blacklist processing module;

the time processing module is connected with the timer and the dynamic blacklist processing module, and is configured to compare the duration of the call with a call duration threshold, and start up the dynamic blacklist processing module when the duration of the call is determined less than the call duration threshold; and the dynamic blacklist processing module is connected with the time processing module, and is configured to judge whether the call number is in the dynamic blacklist list or not, wherein if the call number is not in the dynamic blacklist list, the call number is added into the dynamic blacklist; and if the call number is in the dynamic blacklist list, the call number is added into the static blacklist list, and an existing corresponding item of the number is deleted from the dynamic blacklist.

In the above-mentioned scheme, the device also comprises a blacklist aging maintenance module;

the processing module is further configured to add a timestamp of the call number into the blacklist list; and the blacklist aging maintenance module is configured to detect each blacklist record in the blacklist list, and delete corresponding blacklist record when the difference value between current timestamp and blacklist timestamp of a current blacklist record is determined more than a set blacklist aging time.

Wherein, the processing module is further configured to record a firewall log of the call number.

The implement method and the device of the terminal call firewall provided by the present invention put forward several essential factors, the call duration threshold value Td, the static blacklist, and the dynamic blacklist and so on, and have the following advantages: the present invention can ensure the terminal to identify unknown nuisance call automatically during operation, can add the nuisance call number directly into the blacklist such that the user is not bothered by ringing the terminal or prompting the user of the call, has high recognition rate for the nuisance call number, has remarkable practical effect, does not need the user to add the blacklist manually, and is simple and convenient to use. The present invention also puts forward other two essential factors, blacklist aging time Ta and firewall log, which makes clear the opportunity for recording the firewall log, wherein all key acts executed by the call firewall are recorded in the log, which is convenient for the user to know the execution details of the call firewall so as to adjust various preset parameters, ensures that the call firewall operates under optimal state, and the present invention maintains the blacklist periodically, can automatically clear invalid nuisance number, and can magnificently optimize the performances of the call firewall and terminal resources.

Other characteristics and advantages of the present invention will be described in the following specification, and will be apparent partly from the specification and embodiments of the present invention. The objects and other advantages of the present invention can be realized and obtained through the structures specified in the specification, claims, and the drawings.

BRIEF DESCRIPTION OF THE DRAWINGS

The drawings in the specification provide a further understanding of the present invention and constitute a part of the application, and are used for explaining the present invention along with the exemplary embodiments of the present invention, thus not limitative of the present invention, wherein.

DETAILED DESCRIPTION

The technical solution of the present invention involves two important parameters in the implementation process: a call duration threshold Td and a blacklist aging time Ta. When called by an unknown number, the terminal can start up the timer and set a timing time as Td. Then the user can preset a Td, e.g. 4 seconds. When the call duration is shorter than Td, the call from this number is considered as a harassing call; when the call duration is longer than or equal to Td, the call is considered as a normal call. Herein, the call duration means the duration for which a call (ringing) lasts. But according to the implement solution of the present invention, the ringing, vibration or call prompt (call indication) etc. within the period of Td will be shielded and will be not prompted for the user. After determined as a non-harassing call, the call is prompted for the user. Since the numbers in the blacklist list have certain timeliness, the user can preset a blacklist aging time Ta, e.g. 60 days. When the harassing number is added into the static blacklist list or dynamic blacklist list for the first time, the timestamp $t_0$ at the same time shall be recorded simultaneously. The terminal system is provided with a process which periodically maintains the blacklist list and detects in a cycle way the difference value $t_C-t_0$ between current timestamp $t_C$ and the blacklist timestamp $t_0$ of each blacklist record. When $t_C-t_0>Ta$, it means that the corresponding number has aged and become invalid and this number shall be deleted from the list. Therefore, the user can optimize Td and Ta according to the practical situation of his own, so that the function of the call firewall can be better realized.

The implement method of the terminal call firewall provided by the present invention comprises two parts: terminal call processing method and blacklist list maintenance method.

In the case of non-conflict, the embodiments of the present invention and the features in the embodiments can be inter-combined with each other.

The preferable embodiments of the present invention will be detailed hereinafter in connection with the drawings. What should be understood is that the preferable embodiments detailed hereafter are given for the purposes of illustration and explanation only, and thus are not limitative of the present invention.

Figure 1:
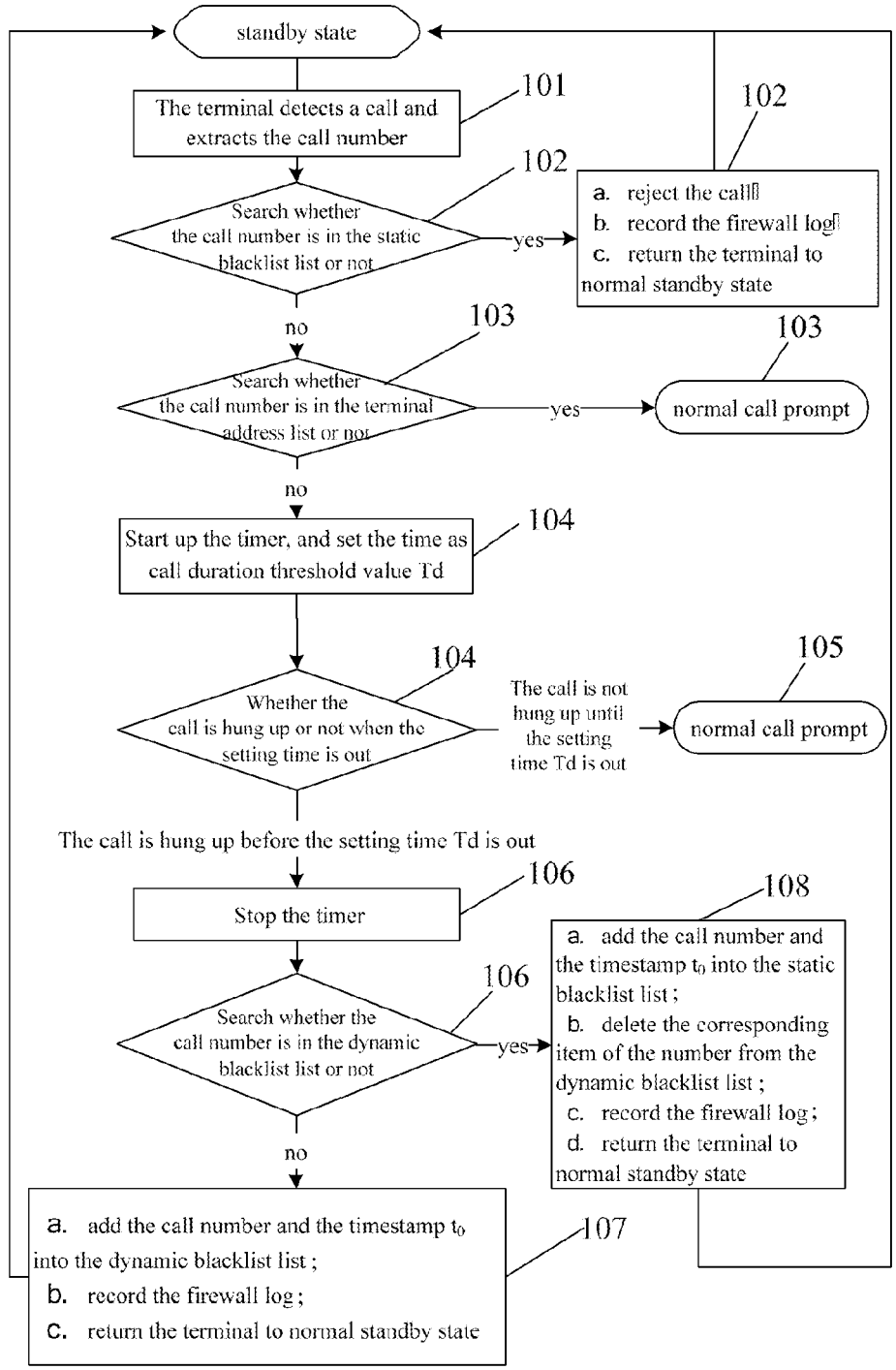
FIG. 1 is a realization flowchart of the terminal call processing method according to the embodiment of the present invention.

As shown in FIG. 1, the realization flow of the terminal call processing method of the present invention comprises the steps as follows:

Step 101: detecting by the terminal a call and extracting the call number;

Step 102: searching whether the call number is in the static blacklist or not wherein if yes, the following steps are executed: a, rejecting the call; b, recording a firewall log; c, the terminal returning to normal standby state; and if no, step 103 is executed.

In the above, the static blacklist list is defined with respect to the dynamic blacklist list. When an unknown number is identified as a harassing call for the first time, the number shall be added into the dynamic blacklist list. If the terminal already detected the number and has added the number into the dynamic blacklist list, the number will be added into the static blacklist list and be deleted from the dynamic blacklist list when the number is detected again. The two kinds of blacklists lists comprise at least two essential factors: number and timestamp.

The format of the above-mentioned firewall log can be described as shown in the following table:

| | |
|---|---|
| Current date and time | 2008-11-29 17:00:00 |
| Call number | 13300000000 |
| Blacklist timestamp $t_0$ | 2008-10-08 13:00:00 |
| Log details | The call number matches with the static blacklist, and the call is rejected. |

Step 103: searching whether the call number is in the terminal address list or not wherein if yes, a normal call processing flow is executing, such as ringing, vibration, call prompt (call indication); and if no, it means that the number is an unknown number, and step 104 is executed.

Step 104: starting up the timer, and setting the timing time as Td. During the time period from the time when the timer is started up to the time when the timer is time out or stopped, the terminal will not have any call prompt, and two situations need to be processed: a, if the call is not hung up when the timing time Td expires, step 105 is executed; and b, if the call has been hung up when the timing time Td does not expires, step 106 is executed.

Step 105: if the call is not hung up and the timing time Td expires, the number is considered as a common number, and a normal call processing flow, such as ringing, vibration, call prompt, is executed.

Step 106: if the call is hung up before the timing time Td expires, the call number is considered as a harassing number, the timer is stopped, and searching is made for whether the call number is in the dynamic blacklist list or not, wherein if no, step 107 is executed, and if yes, step 108 is executed.

Step 107: the following operations are executed: a, adding the call number and the timestamp $t_0$ at this time into the dynamic blacklist list; b, recording a firewall log; and c, returning the terminal to normal standby state.

The format of the firewall log in this step can be described as shown in the following table:

| | |
|---|---|
| Current date and time | 2008-11-29 17:30:00 |
| Call number | 13300000000 |
| Blacklist timestamp $t_0$ | 2008-11-29 17:30:00 |
| Log details | The call duration is too short, and the number is considered as a harassing number and is added into the dynamic blacklist list. |

Step 108: the following operations are executed: a, adding the call number and the timestamp $t_0$ at this time into the static blacklist list; b, deleting an existing corresponding item of the harassing number from the dynamic blacklist list; c, recording a firewall log; and d, returning the terminal to normal standby state.

The format of the firewall log in this step can be described as shown in the following table:

| | |
|---|---|
| Current date and time | 2008-11-29 17:30:00 |
| Call number | 13300000000 |
| Blacklist timestamp $t_0$ | 2008-11-29 09:10:00 |
| Log details | The call duration is too short, and the number is considered as a harassing number. As matching with the dynamic blacklist, the number is transferred to the static blacklist list. |

Figure 2:
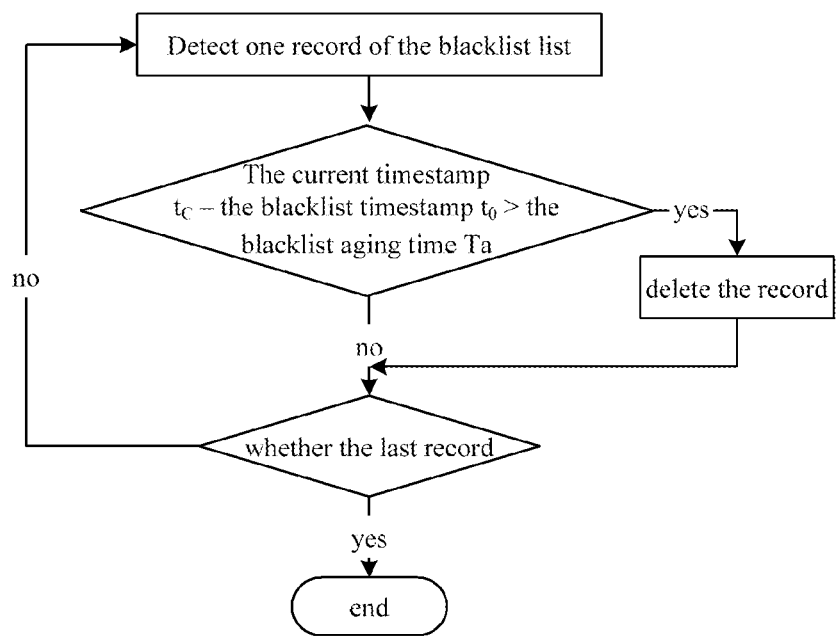
FIG. 2 is a realization flowchart of the terminal blacklist list maintenance method according to the embodiment of the present invention.

The terminal of the present invention is provided with a default task: executing the blacklist maintenance process once every day at specific time which can be set by the terminal user. Each time after the terminal is powered on and started up, the blacklist maintenance process is also executed once, preventing the user who powers off the terminal frequently from missing the time of maintaining the blacklist. As shown in FIG. 2, the realization flow of the terminal blacklist list maintenance method of the present invention comprises the steps as follows.

The terminal detects one blacklist record in the dynamic blacklist list or the static blacklist list. If $t_C$ (the current timestamp)−$t_0$ (the blacklist timestamp of the current blacklist record)>Ta (the blacklist aging time), the blacklist record is deleted and the firewall log is recorded. If $t_C$ (the current timestamp)−$t_0$ (the blacklist timestamp of the current blacklist record)<Ta (the blacklist aging time), it is continued to detect next blacklist record until the last record of the blacklist list.

The following table can be referred to, for the format of the firewall log recorded in this flow:

| | |
|---|---|
| Current date and time | 2008-11-29 22:10:00 |
| Call number | 13300000000 |
| Blacklist timestamp $t_0$ | 2008-09-29 23:50:00 |
| Log details | The present number has stored in the static blacklist over 60 days; the number has been aged and become invalid, and will be deleted. |

Figure 3:
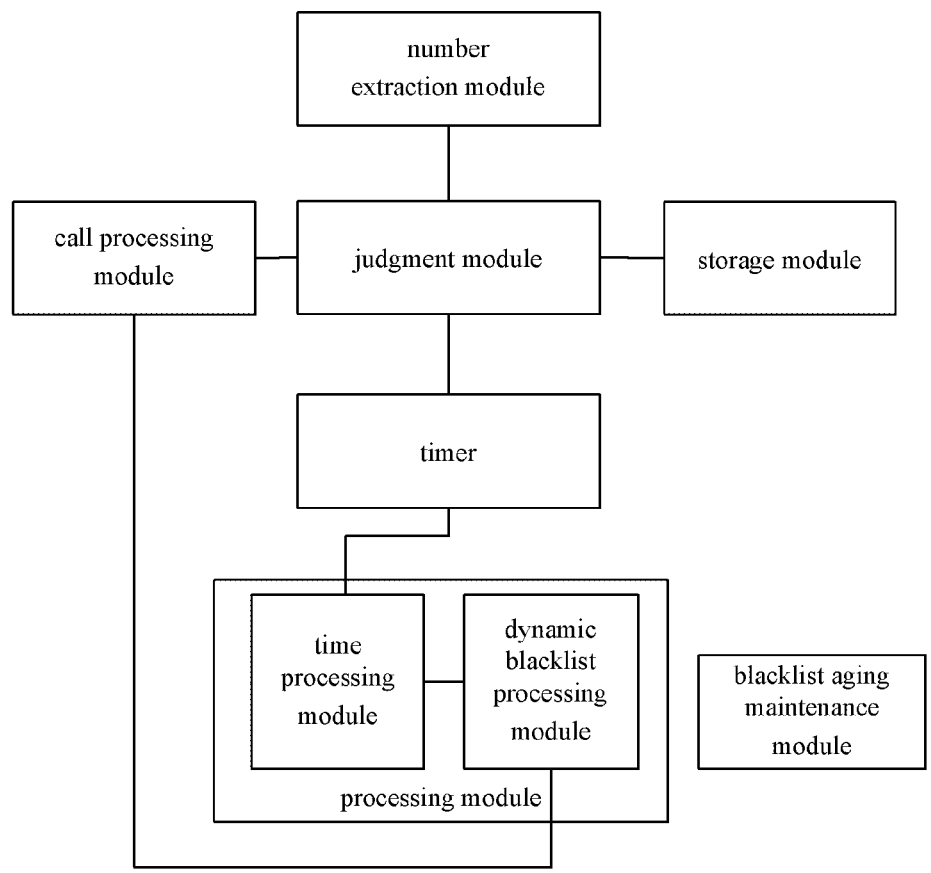
FIG. 3 is a structural schematic diagram of the device of the terminal call firewall according to the embodiment of the present invention.

The present invention also provides an implement device of the terminal call firewall. As shown in FIG. 3, the device comprises a number extraction module, a judgment module, a call processing module, a storage module, a timer and a processing module.

In the above, the number extraction module is connected with the judgment module, and is used for extracting the call number. When the terminal receives a call, the number extraction module extracts the call number, and transmits it to the judgment module.

The storage module is connected with the judgment module, and is used for storing the terminal address list, the static blacklist list and the dynamic blacklist list, and storing the firewall log as well.

The judgment module is connected with the storage module and the timer. When receiving the call number transmitted by the number extraction module, the judgment module judges whether the call number is in the stored static blacklist list or the address list or not. When the call number is determined not in the stored static blacklist list or the address list, the judgment module starts up the timer to start timing; and when the call number is determined in the stored static blacklist list or the address list, the judgment module starts up the call processing module.

The timer is connected with the judgment module and the processing module, is used for timing the time length of the call duration threshold Td, and starts timing after receiving the timing instruction of the judgment module.

The processing module is connected with the timer, and comprises a time processing module and a dynamic blacklist processing module. The time processing module is connected with the timer and the dynamic blacklist processing module, and is used to compare the call duration with Td if the timer is time out, start up the dynamic blacklist processing module if the call duration is determined less than Td, and start up the call processing module if the call duration is determined more than Td. The dynamic blacklist processing module is connected with the time processing module and the call processing module, and is used to judge whether the call number is in the dynamic blacklist list or not. The dynamic blacklist processing module adds the call number and the current timestamp into the dynamic blacklist list if the call number is not in the dynamic blacklist list, and adds the call number and the current timestamp into the static blacklist list and delete the existing corresponding item of the number from the dynamic blacklist list if the call number is in the dynamic blacklist list.

The call processing module is connected with the judgment module and the processing module, and is used to perform normal call prompt when the call number is in the address list or when the call duration is more than Td, and return the terminal to normal standby state when the call number is in the static blacklist list or the dynamic blacklist list.

The device also comprises a blacklist aging maintenance module which is used for detecting each blacklist record in the blacklist list, and deleting corresponding blacklist record when the difference value between current timestamp and the blacklist timestamp of the current blacklist record is determined more than the set blacklist aging time Ta.

The descriptions above are only preferable embodiments of the present invention, which are not used to restrict the protection scope of the present invention. Any amendments, equivalent substitutions, improvements etc. within the spirit and principle of the present invention are all included in the protection scope of the present invention.

What is claimed is:

1. An implement method of a terminal call firewall, wherein the terminal call firewall comprises a processor coupled to memory, comprising:
    receiving an incoming call at a terminal, wherein the incoming call lasts less than a predefined call duration threshold;
    identifying a call number associated with the incoming call;
    determining, using the processor, whether the call number is present in either a static blacklist stored in the terminal or an address list stored in the terminal;
    when the call number is absent from both the static blacklist and the address list:
        checking whether the call number is present in a dynamic blacklist stored in the terminal;
        when the call number is present in the dynamic blacklist:
            adding the call number and a current timestamp associated with the call number to the static blacklist and removing the call number from the dynamic blacklist; and
        when the call number is not present in the dynamic blacklist:
            adding the call number to the dynamic blacklist;
    selecting an entry from the static blacklist, the entry including a second call number and associated timestamp for the second call number;
    determining an existence time of the second call number in the static blacklist by comparing the timestamp associated with the second call number with a current timestamp;
    when the existence time of the second call number in the static blacklist is longer than a predefined blacklist aging time threshold, deleting the selected entry from the static blacklist; and
    repeating said selecting an entry from the static blacklist, determining an existence time of the second call number in the static blacklist, and deleting the selected entry from the static blacklist operations for each entry in the static blacklist.

2. The method according to claim 1, further comprising:
    after the call number is added to either the dynamic blacklist or the static blacklist, generating an entry in a firewall log for the addition of the call number.

3. A device of a terminal call firewall, wherein the device is for automatically blocking incoming calls to the terminal, the device comprising:
    a processor; and
    memory for storing one or more program modules to be executed by the processor, wherein the one or more program modules include functions for:
        receiving an incoming call at a terminal, wherein the incoming call lasts less than a predefined call duration threshold;
        identifying a call number associated with the incoming call;
        determining whether the call number is present in either a static blacklist stored in the terminal or an address list stored in the terminal;
        when the call number is absent from both the static blacklist and the address list:
            checking whether the call number is present in a dynamic blacklist stored in the terminal;
            when the call number is present in the dynamic blacklist:
                adding the call number and a current timestamp associated with the call number to the static blacklist and removing the call number from the dynamic blacklist; and
            when the call number is not present in the dynamic blacklist:
                adding the call number to the dynamic blacklist;
        selecting an entry from the static blacklist, the entry including a second call number and associated timestamp for the second call number;
        determining an existence time of the second call number in the static blacklist by comparing the timestamp associated with the second call number with a current timestamp;
        when the existence time of the second call number in the static blacklist is longer than a predefined blacklist aging time threshold, deleting the selected entry from the static blacklist; and
        repeating said selecting an entry from the static blacklist, determining an existence time of the second call number in the static blacklist, and deleting the selected entry from the static blacklist operations for each entry in the static blacklist.

4. The device according to claim 3, wherein the one or more program modules further include functions for: generating an entry in a firewall log for the addition of the call number after the call number is added to either the dynamic blacklist or the static blacklist.

* * * * *